Patented Sept. 22, 1936

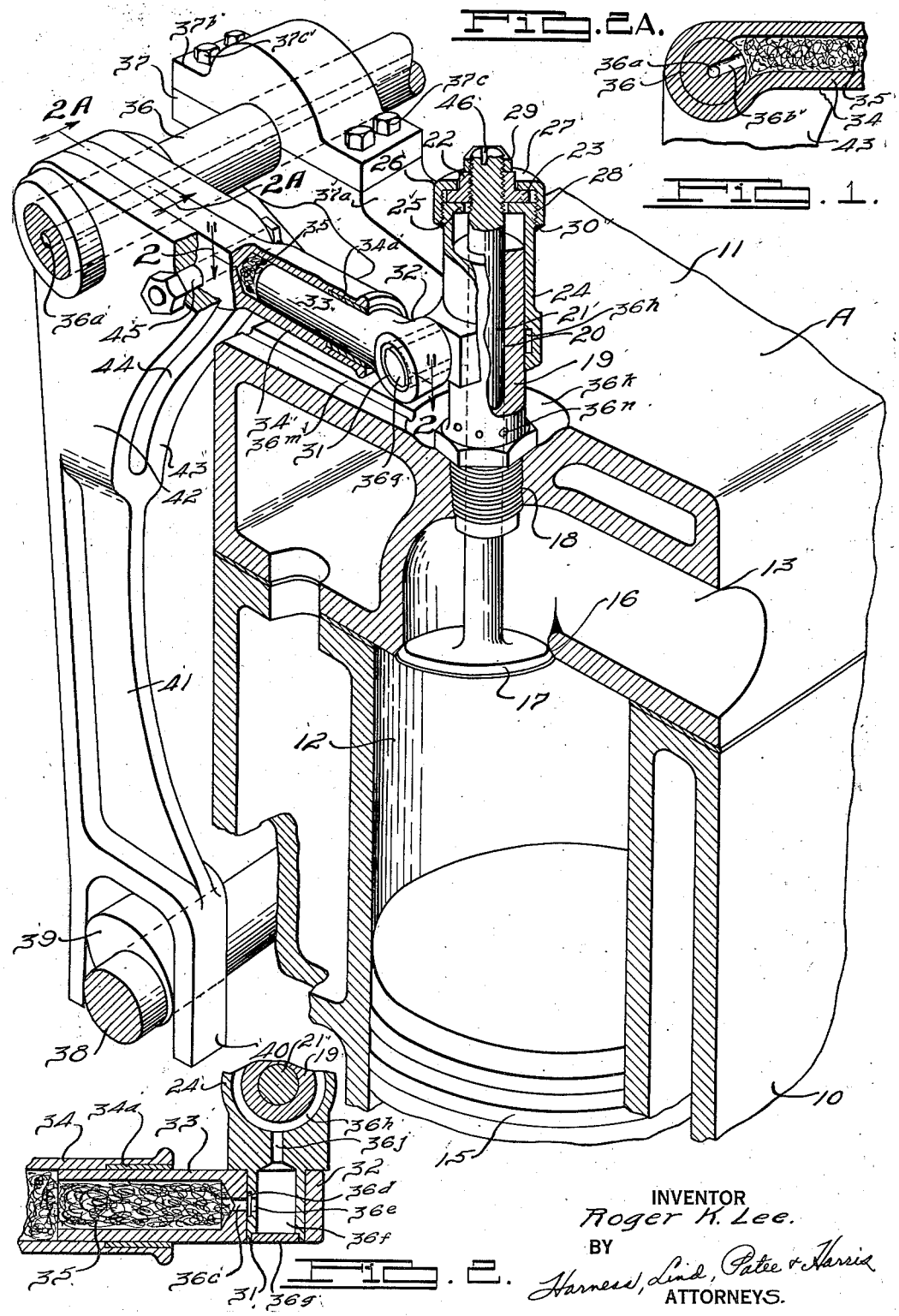

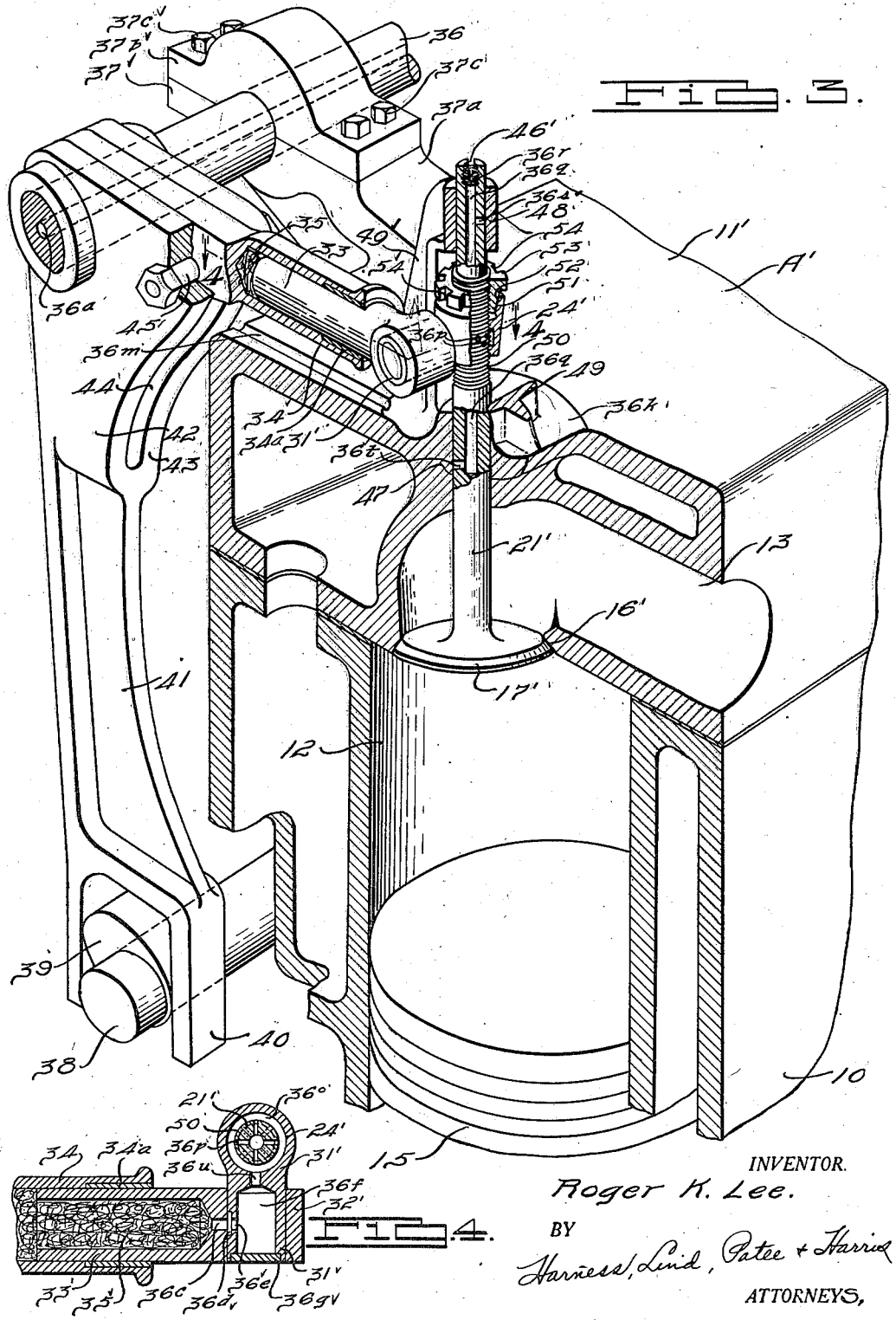

2,055,454

UNITED STATES PATENT OFFICE 2,055,454

ENGINE VALVE OPERATING MECHANISM

Roger K. Lee, Highland Park, Mich., assignor to Chrysler Corporation, Detroit, Mich., a corporation of Delaware Application May 19, 1934, Serial No. 726,489

19 Claims. (Cl. 123—90)

This invention relates to internal combustion engines and refers more particularly to improvements in valve operating mechanisms for such engines.

It is an object of my invention to provide improvements in positive actuating mechanisms for valves.

A further object of my invention is to provide improved valve operating means capable of operating at relatively high engine speeds.

Further objects of my invention are to increase the efficiency of engine operation; to provide a high speed engine valve gear operating with a minimum of vibration or other disturbing forces; and to provide a relatively light weight valve operating mechanism capable of high speed positive operation.

Another object of my invention, according to one embodiment thereof, resides in the provision of an improved valve operating mechanism adapted to permit self-adjustment of the valve relative to the seat during engine operation; also a mechanism wherein the various parts are self-aligning.

A still further object of my invention is to provide safety means in the valve gearing adapted to protect the valving mechanism in the event of undue stresses arising in the mechanism.

An additional object of my invention is to provide safety means for conveniently adjusting the valve relative to its seat.

Other objects of my invention are to provide a positive valve operating mechanism capable of assembly and disassembly with respect to an engine cylinder without necessitating tearing down the valve operating mechanism or disturbing the cylinder, and also preferably without disturbing the cylinder head; to provide a positive valve operating mechanism including an operating lever capable of assembly or disassembly with or from cam operating means preferably by moving the operating lever and associated valve operating assembly outwardly in the general direction of the associated cylinder or inwardly and outwardly of the cylinder; to provide an improved arrangement of cylinder and valve operating mechanism capable of expansion and contraction under varying engine temperatures without appreciably altering the valve timing; to provide improvement in the lubrication of positive valve operating mechanisms preferably by the use of a force feed oiling system; and to provide a valve operating mechanism having an operating connection for the valve stem offset from the axis of the valve stem with means for taking up the resulting off-axis loading of the valve stem independently of the valve stem.

Further objects and advantages of my invention will be more apparent from the following detailed description of several illustrative embodiments thereof, reference being had to the accompanying drawings, in which:

Fig. 1 is a sectional perspective view through the engine illustrating a typical valve operating mechanism, parts thereof being broken away to illustrate the details of construction.

Fig. 2 is a detail sectional view along the line 2—2 of Fig. 1.

Fig. 2A is a detail sectional view along the line 2A—2A of Fig. 1.

Fig. 3 is a similar view illustrating a modified embodiment of my invention.

Fig. 4 is a detail sectional view along the line 4—4 of Fig. 3.

In the drawings, reference character A represents the engine having the jacketed cylinder block 10 and cylinder head 11. In Fig. 1 the section is taken through the engine to illustrate a typical cylinder 12 thereof and either the intake or exhaust gas passage 13, it being understood that the valving mechanism for intake and exhaust is preferably of similar construction and operation. The cylinder block 10 may have the usual cylinders, one of which is shown at 12, together with the piston 15 reciprocating therein. The foregoing parts are well-known in the art and may be of any preferred form.

The passage 13 has a valve seat 16 intermediate the passage and cylinder 12, this seat being periodically engaged by a valve 17 herein illustrated as the poppet type. Threadedly mounted in an opening 18 in the cylinder head 11 is an upwardly or outwardly extending valve stem guide 19 having an axial bore 20 slidably receiving the stem 21 for the valve 17. The upper end of the valve stem is threaded to adjustably receive the collar 22 having an annular flange 23.

Surrounding the guide 19 in slidable engagement therewith is a downwardly open sleeve 24 provided at its upper end with an inwardly extending annular flange 25 freely spaced from the stem 21 and engaging the under face of flange 23. For securing the sleeve 24 to the collar 22 I have provided a cap 26 having an axially perforated flange 27 surrounding the collar 22 and bearing downwardly against the flange 23, the cap 26 having a cylindrical sleeve portion threadedly engaging the upper end of the sleeve 24 as shown at 28.

After the collar 22 has been adjusted on the valve stem 21, as will be presently more apparent, the collar 22 is secured in position by a lock nut 29 and the cap 26 is preferably locked in position by welding at 30 with the sleeve 24 or by other suitable expedient.

Projecting laterally from the lower end of sleeve 24 is a pin or crank arm 31 engaged by the bearing portion 32 of a transversely extending hollow rod 33. The rod 33 thus lies off-center from the axis of sleeve 24 and generally tangentially of said sleeve and valve stem.

The rod 33 forms one member of a telescopic operating linkage, the other member or socket element 34 being bored to slidably receive rod 33, a suitable lubricant packing such as oil impregnated felt 35 being located within the telescoping members 33 and 34. The outer end of the member 34 is flattened and is loosely journaled on a pivot shaft 36 which extends longitudinally of the engine in suitable bearings, one of which is shown at 37.

The inner end of the socket member 34 is provided with a pressed-in bushing 34ᵃ of suitable material adapted to take the sliding thrust on the rod 33 at the region of greatest tendency for wear to take place. The bearings 37 are carried by supporting arms 37ᵃ and the bearings are split horizontally or transversely to the cylinder axis and provided with bearing caps 37ᵇ removably secured to the lower bearing portions 37 by suitable fasteners 37ᶜ.

For actuating the telescopic linkage 33, 34, I have provided a cam shaft 38 suitably driven in the well-known manner from the engine crank shaft (not shown), the cam shaft operating at half crank shaft speed for the four stroke cycle engine illustrated. The cam shaft 38 is appropriately supported by the lower or inner crank case end of cylinder 12 and has a series of intake and exhaust cams for operating the respective valves, one of the cams 39 being illustrated. A cam follower 40 is provided on the downwardly extending end of a lever 41, the upper end of this lever having the spaced bell crank forks 42, 43 separated by a space 44 receiving the flattened outer end of the member 34. The lever forks 42, 43 are also loosely journaled on the shaft 36.

Extending through forks 42, 43 and the member 34 is a shear pin 45 normally serving to rigidly connect lever 41 with member 34 but adapted to shear in response to undue stress in the actuating mechanism to disconnect these parts. The shaft 36 may receive, at intervals along its length, the various groups of lever forks and telescoping arm members for the various intake and exhaust valves of each cylinder where the engine cylinders are arranged in line as will be readily understood.

In operation of the valving mechanism of Fig. 1, as thus far described, the cam shaft 38 is driven in timed relation with the engine crank shaft to positively alternately actuate the valve 17 away from its seat and to its illustrated seated position. During this operation, the cam 39 oscillates the lever 41 about the pivot shaft 36, the pin 45 normally causing corresponding oscillation of the socket member 34.

As the member 34 oscillates in a vertical plane, the rod 33 is likewise actuated, it being apparent that the lever 41 and members 34, 33 together form a bell crank lever, the horizontal lever arm thereof having a telescopic driving connection to the sleeve 24. Since the valve stem 21 is vertically guided in its reciprocation by the guide 19, it is apparent that the rod 33 will reciprocate longitudinally in socket 34, the bearing portion 32 having a slight rotation on pin 31 to accommodate the movement of the valve operating parts. The sleeve 24 thus has axial reciprocation on the guide 19, the sleeve acting through the collar 22 to likewise reciprocate the valve stem 21 and valve 17.

The flange 23 may rotate between flanges 25 and 27 during valve actuation and since the valve stem 21 is locked to collar 22 by the lock nut 29, it will be apparent that the valve 17 will slightly rotate and maintain a uniform seat free from irregularities which might otherwise give rise to gas leakage past the valve.

By loosening the lock nut 29 and holding the collar 22, the valve stem 21 may be rotated for readily adjusting the valve 17 on its seat 16 for the proper fit initially as well as after a period of service. The stem 21 has a slot 46 at its upper end to receive a screw driver to adjust the valve stem and valve.

It will be apparent that my valve actuating mechanism is self-aligning thereby facilitating the manufacture, assembly, and operation of the parts. Minor variations in distances between centers and axes of the operating parts are readily compensated for in the mechanism. Thus minor variations in the distance between the axes of shaft 36 and valve stem 21 are compensated for at the telescopic connection provided by socket 34 and rod 33; likewise variations in the elevation of shaft 36 relative to sleeve 24 will be compensated for by the rotary connection of bearing 32 and pin 31.

My valve operating mechanism is capable of improved operation at relatively high engine speed approximately 5,000 to 10,000 R. P. M. although I do not limit my invention in this respect.

Before describing the lubricating means for my valve operating mechanism, I desire to point out that my valve operating mechanism may be assembled and disassembled with respect to the associated engine cylinder without requiring tearing down the valve operating mechanism or disturbing the cylinder or cylinder head. Thus, when it is desired to remove the valve operating mechanism as a unitary assembly it is only necessary to remove lock nut 29 and bearing caps 37ᵇ. The valve stem 21 is then threaded inwardly to permit the valve and valve stem to fall inwardly sufficiently to release the valve stem from engagement with the outer parts carried by sleeve 24, the piston 15 being in its inward position to accommodate this inward valve movement. The assembly including lever 41, shaft 36, together with telescoping members 33, 34 and sleeve 24 may then be removed by lifting the assembly upwardly in the general direction of the cylinder axis. This assembly may be placed in position by reversing the aforesaid steps, it being apparent that the assembly is readily connected or disconnected to or from the valve stem.

The preferred arrangement is, according to my drawings, such that the lever arm 41 extends in the general outward direction of the cylinder axis, this arrangement providing a number of advantages. Thus, the lever 41 is readily inserted or removed to or from operative engagement with cams 39 without requiring anything more than merely moving the lever arm downwardly or upwardly. Furthermore, as the cylinder expands outwardly and contracts inwardly under temperature variations, the lever 41 is carried with the cylinder and the follower portion 40 readily accommodates such movement without perceptive alteration in the valve timing operation.

It will also be apparent that, while the rod 33 loads the sleeve 24 laterally of the axis of the valve stem, the tendency to load the valve stem with a side thrust is prevented by reason of the sleeve 24 bearing on the guide 19, the latter absorbing the side thrust so that only vertical forces are applied to the valve stem. The valve stem and sleeve 24 may therefore be made relatively light in weight. Furthermore, by suitably varying the lengths of the sleeve 24 and guide 19, the bearing area may be readily altered to accommodate different speeds to which the engine is subjected.

Referring now to my lubrication system, it will be noted that the shaft 36 has a central bore 36$^a$ adapted to receive a supply of lubricating oil under pressure for distribution to the various telescoping lever arms mounted on the shaft. If desired, the bore 36$^a$ may be a part of the usual pressure feed oiling system of the engine. At each shaft bearing portion of members 34, the shaft 36 has a radial oil passage 36$^b$ opening to the bore of the member 34 as seen in Fig. 3. It will be apparent that the oil in passing from bore 36$^a$ to the member 34 will also lubricate the bearing for the member 34 on shaft 36, the oil also working its way along shaft 36 to lubricate the bearings for lever 41 on shaft 36. If desired separate oil passages for the latter bearings from conduit 36$^a$ may be provided. The oil thus supplied to member 34 passes through the member 33, lubricating the sliding telescopic joint and maintaining the felt 35 in oil soaked condition. The oil then passes through a conduit 36$^c$ to an arcuate groove 36$^d$ formed in the surface of the pin 31, the groove being of sufficient arcuate length to maintain registration with the conduit 36$^c$ during oscillatory movement of bearing 32 on the pin. The bearing between pin 31 and the bearing portion 32 will thus be adequately lubricated.

From the conduit 36$^c$ the oil is conducted to the chamber 36$^f$ by a radial passage 36$^e$ opening to the groove 36$^d$. The outward end of the pin chamber 36$^f$ is closed by a disc 36$^g$ welded or otherwise secured in place.

The sleeve 24 has an annular oil groove 36$^h$ for supplying lubricant to the bearing surfaces between the sleeve 24 and guide 19, the groove 36$^h$ communicating through a passage 36$^j$ with the pin chamber 36$^f$ as best seen in Fig. 2.

The oil from groove 36$^h$ works upwardly and downwardly in a properly restricted manner to the upper portion of valve stem 21 above guide 19 and to the collector recess 36$^k$ provided in the top of the cylinder head 11 around the base of guide 19 whence the oil may be returned to the crank case or other suitable point by one or more lateral drain grooves 36$^m$.

Any excess oil which works downwardly between valve stem 21 and guide 19 may be drained to the collector recess 36$^k$ by the series of passages 36$^n$.

In operation, it will be apparent that oil under pressure is continuously supplied to all of the sliding and rotating bearing surfaces of the valve operating mechanism.

Referring now to the embodiment of my invention illustrated in Figs. 3 and 4, it will be noted that many of the parts of the valve operating mechanism associated with engine A' are similar in construction according to the designation of such parts by the same reference characters referred to in connection with the Fig. 1 embodiment and these similar parts need not be described in detail again.

In Fig. 3 the valve 17' has a stem 21' reciprocating in vertically spaced guides 47, 48 of a bracket 49 formed as a part of the cylinder head 11', the valve stem having a threaded portion 50 intermediate the guides.

Engaging the threads 50 is a sleeve 24' carrying the pin or crank arm 31', the latter being rotatably engaged by the bearing portion 32' of the rod 33. The sleeve 24' has an upwardly opening frusto conical portion 51 receiving a similarly shaped portion 52 of the locking nut 53 adjustable on threads 50. The nut 53 has peripheral wrench engaging slots 54 to facilitate its locking adjustment and the valve stem 21' has an adjusting slot 46'.

In operation of the Fig. 3 embodiment, the valve 17' is reciprocated in guides 47, 48, by the valve operating mechanism in a manner generally similar to the Fig. 1 embodiment, the Fig. 3 embodiment having its reciprocating parts associated with the valve of somewhat lighter weight. Thus, as the socket member 34 is reciprocated by cam 39 and link 41, the pin 31' has a reciprocating movement in the direction of the axis of valve stem 21'. In Fig. 3 I have omitted the Fig. 1 structure for permitting the valve to slightly rotate during operation.

In adjusting the valve 17' with reference to its seat 16', the nut 53 is loosened from engagement with the conical portion 51 of sleeve 24' and the valve stem 21' is given the desired amount of rotary adjustment, the stem moving aixally by reason of the threads 50 engaging the non-rotatable sleeve 24'. After adjustment the nut 53 is tightened against the conical seat 51 to maintain the adjusted position of the valve stem with reference to the telescopic arm of the bell crank lever formed by lever 41, forks 44, 43 and the telescoping members 33, 34.

Before describing the details of the lubricating system for the Fig. 3 embodiment, it will be apparent that many of the advantages set forth in connection with the Fig. 1 embodiment are also realized in the Fig. 3 embodiment. Thus, the major portion of the valve operating mechanism may be readily disassembled with respect to the cylinder and cylinder head by loosening the nut 53 and allowing the valve 17' and stem 21' to fall inwardly to permit removal of the sleeve 24' and its pin 31' from the bearing portion 32'. The mechanism may then be lifted as a unit, after the bearing caps 37$^b$ are removed substantially as aforesaid. Assembly of the mechanism is accomplished by reversing the aforesaid steps in the disassembly.

Furthermore, in the Fig. 3 embodiment, the side thrust on the valve stem 21' occasioned by the offset pin 31' is relieved by the guides 48 and 49 which may be readily varied in length and spacing for different cylinder heads to accommodate different desired operating speeds and attendant stress variations in the operating mechanism.

Referring now to my lubricating system illustrated in the Fig. 3 embodiment, the oil is supplied from shaft passage 36$^a$ to the pin chamber 36$^f$ just as described in connection with Fig. 1. From this pin chamber the oil passes through conduit 36$^u$ to an annular groove 36$^o$ in sleeve 24', the threaded part 50 of valve stem 21' having one or more radial openings 36$^p$ arranged so that communication is always established between groove 36º and an axial passage 36ᑫ which is drilled through the valve stem to a point opposite the bearing guide 47. Thus, within the range of minor adjustment of the valve 17', the stem passage 36ᑫ will be supplied with oil under pressure.

The upper end of the stem passage is closed by a screw plug 36ʳ and the valve stem has radial passages 36ˢ and 36ᵗ for respectively at all times supplying oil from the axial stem passage 36ᑫ to the sliding bearings for the stem provided by the guides 48 and 47. Excess oil may be drained by the same collector recess 36ᵏ and groove 36ᵐ referred to in connection with Fig. 1.

Various modifications and changes will be readily apparent from the teachings of my invention, as set forth in the appended claims, and it is not my intention to limit my invention to the particular details of construction and operation shown and described herein for illustrative purposes.

What I claim is:

1. In an engine valve operating mechanism, a valve having a threaded stem, a pin projecting laterally from said stem, means engaging said stem threads for attaching said pin to said stem, said pin being disposed at a point intermediate the length of said stem, an actuating element rotatably connected to said pin, a lever member telescopically connected to said actuating element, and means including a cam for positively reciprocating said lever member.

2. In an engine valve operating mechanism, a valve having a stem threaded intermediate its length, a pin projecting laterally from said stem, a sleeve carrying said pin and surrounding said stem, means engaging said stem threads for securing said sleeve to said stem, and means for positively reciprocating said pin.

3. In an engine valve operating mechanism, a valve having a threaded stem, a pin projecting laterally from said stem at a point intermediate the length of said stem, a sleeve carrying said pin, means for adjustably supporting said sleeve on the threads of said valve stem, and means for positively reciprocating said pin.

4. In an engine valve operating mechanism, a valve, valve operating means including a bell crank lever adapted to positively reciprocate said valve, and means for releasing the drive through said valve operating means in response to a predetermined resistance to operation of said valve, said releasing means comprising a shear pin normally connecting one of the arms of said lever to the other arm.

5. In an engine valve operating mechanism, a valve, a hollow actuating member, a rod member telescopically received by said hollow member, a bushing carried by and within said hollow member in sliding contact with said rod member, said bushing being disposed adjacent the outer end of said hollow member, means for operably connecting one of said members to said valve for positively reciprocating the valve, and means for operating the other of said members in timed relation with the engine.

6. In an engine valve operating mechanism, a valve, a hollow actuating member, a rod member telescopically received by said hollow member, means for operably connecting one of said members to said valve for positively reciprocating the valve, means for operating the other of said members in timed relation with the engine, and lubricating means for said members contained within one of said members.

7. In an engine valve operating mechanism, a valve having a stem portion, means for axially guiding said stem for reciprocation of said valve, a sleeve through which said stem projects, means for securing said sleeve to said stem in a plurality of positions of adjustment relatively thereto longitudinally of said stem, a pin carried by said sleeve and projecting laterally therefrom substantially perpendicular to the axis of said stem, a rod having a bearing portion rotatably receiving said pin, said rod extending substantially perpendicular to the axis of said pin and generally tangentially of said sleeve, an actuating member having a socket portion telescopically receiving said rod for axial movement relative to said actuating member, a shaft extending longitudinally of the engine, said actuating member having an outer end pivotally supported by said shaft, a substantially vertical lever having upwardly terminating forked portions pivoted on said shaft, said forked portions being spaced axially of said shaft to receive said outer end of the actuating member therebetween, a shear pin extending through said forked portions and said actuating member to releasably connect said lever with said actuating member, said lever having a cam follower portion at its lower end, and a cam operating said follower portion to positively oscillate said lever on said shaft.

8. In an engine valve operating mechanism, a valve having a stem, a stationary guide member having an axial bore slidably receiving said stem to guide reciprocation thereof, a sleeve slidably mounted on said guide member, means for connecting said stem to said sleeve whereby said stem is held against axial movement relative to the sleeve but is free to rotate about its axis, a pin carried by said sleeve, and means for positively reciprocating said pin in the direction of the axis of said valve stem.

9. In an engine valve operating mechanism, a valve having a stem, means for guiding said stem for reciprocation, said stem having a threaded portion intermediate its ends, a sleeve threaded to said stem portion and having a frusto conical recess, a lock nut threaded to said stem portion and engaging said recess, a pin carried by said sleeve, and means for positively reciprocating said pin in the direction of the axis of said valve stem.

10. In an engine valve operating mechanism, a valve having a stem, means including a pin connected to said stem for positively operating the valve, said pin being offset from the axis of said stem, and guide means for said stem adapted to relieve said stem of the side thrust tending to be produced thereon by said offset pin.

11. In an engine valve operating mechanism, a valve having a stem, means including a pin connected to said stem for positively reciprocating said valve, means including an actuating element connected to said pin for actuating said pin, and means for supplying lubricant under pressure through said actuating element to lubricate said element and pin connection.

12. In an engine valve operating mechanism, a valve having a stem, said stem having an axial passage, means for guiding said stem, a pin connected to said stem for positively reciprocating said valve, means for actuating said pin, and means for supplying lubricant under pressure through said pin and valve stem passage to lubricate said stem guiding means.

13. In an engine valve operating mechanism, a valve having a stem, means for guiding reciprocation of said stem, means including relatively slidable members for positively reciprocating said stem, and means for supplying lubricant under pressure to said stem guiding means and to said slidable members.

14. In an engine valve operating mechanism, a poppet valve having a stem, a sleeve surrounding said stem, means for securing said sleeve to said stem, a cantilever crank pin carried by and forming a rigid portion of said sleeve and having its axis perpendicular to the axis of the valve stem, said crank pin being disposed at a point intermediate the length of said valve stem, said crank pin projecting laterally from said sleeve and stem, and means timed with the engine and including a lever having slidably connected arm portions for reciprocating said crank pin in the general direction of the valve stem axis.

15. In an engine valve operating mechanism, a poppet valve having a stem, a sleeve surrounding said stem, means for securing said sleeve to said stem, a cantilever crank pin carried by and forming a rigid portion of said sleeve and having its axis perpendicular to the axis of the valve stem, said crank pin being disposed at a point intermediate the length of said valve stem, said crank pin projecting laterally from said sleeve and stem, and means timed with the engine and including a bell crank lever having one lever arm thereof formed of telescoping relatively slidable portions for reciprocating said crank pin in the general direction of the valve stem axis.

16. In an engine valve operating mechanism, a poppet valve having a stem, a sleeve surrounding said stem, means for connecting the outer end of said sleeve to said stem adjacent the outer end thereof, a crank pin projecting laterally outwardly from said sleeve adjacent the inner end thereof, and means timed with the engine for positively reciprocating said crank pin in the general direction of the valve stem axis.

17. In an engine valve operating mechanism, a poppet valve having a stem, a sleeve surrounding said stem, means for connecting one end of said sleeve to said stem adjacent one end thereof, a crank pin projecting laterally outwardly from said sleeve adjacent the other end thereof, means timed with the engine for positively reciprocating said crank pin in the general direction of the valve stem axis, and a stationary cylindrical guide for said stem and sleeve projecting beyond the last said end of said sleeve.

18. In an engine valve operating mechanism, a poppet valve having a stem projecting outwardly from said valve, a guide bracket carried by the engine and providing a slidable bearing for the outer end of said stem, a sleeve secured to said stem inwardly from said bearing, a crank pin carried by said sleeve and projecting laterally outwardly therefrom, and means for reciprocating said crank pin in the general direction of the valve stem axis.

19. In an engine having a ported cylinder head, a valve controlling said port and having a stem projecting outwardly of said head, a bracket projecting outwardly from said head to provide a bearing for the outer end of said stem, a stem reciprocating member, means for removably attaching said member to said stem intermediate said head and bearing, and means for imparting reciprocaiton to said member to positively reciprocate said valve.

ROGER K. LEE.